United States Patent [19]

Damgaard-Iversen et al.

[11] 4,002,524

[45] Jan. 11, 1977

[54] METHOD AND APPARATUS FOR EVAPORATING LIQUID

[75] Inventors: Jorgen Damgaard-Iversen, Birkerod; Klaus Erik Gude, Vedbaek; Ove Emil Hansen, Vaerlose; Bjorn Lund, Frederiksberg; Mogens Petersen, Lyngby, all of Denmark

[73] Assignee: Aktieselskabet Niro Atomizer, Soborg, Denmark

[22] Filed: Aug. 19, 1974

[21] Appl. No.: 498,607

Related U.S. Application Data

[63] Continuation of Ser. No. 287,868, Sept. 11, 1972, abandoned.

[30] Foreign Application Priority Data

Sept. 10, 1971 Denmark .......................... 4464/71

[52] U.S. Cl. ............................ 159/4 B; 159/4 CC; 159/4 S; 159/4 E; 159/48 R

[51] Int. Cl.$^2$ ...................... B01D 1/16; F26B 3/12

[58] Field of Search ................ 159/4 B, 4 CC, 4 R, 159/4 E, 4 S, 48 R; 23/284; 34/10, 57 R, 57 A, 57 B, 57 C, 57 D, 57 E; 261/151

[56] References Cited

UNITED STATES PATENTS

| | | | |
|---|---|---|---|
| 1,329,737 | 2/1920 | Wolcott | 159/4 A |
| 1,501,876 | 7/1924 | Wreesman | 159/4 S |
| 1,506,647 | 8/1924 | Krause | 159/48 R |
| 1,682,318 | 8/1928 | Beardslee | 159/4 CC X |
| 2,308,992 | 1/1943 | Mertens | 159/4 CC |
| 2,363,281 | 11/1944 | Arnold | 159/4 E |
| 2,461,584 | 2/1949 | Andersen et al. | 202/139 |
| 2,559,989 | 7/1951 | Nyrop | 159/4 B |
| 2,579,944 | 12/1951 | Marshall | 159/48 R X |
| 2,818,917 | 1/1958 | Vincent | 159/48 L |
| 3,110,626 | 11/1963 | Larsen et al. | 159/4 B |
| 3,143,428 | 8/1964 | Reimers et al. | 159/4 CC |
| 3,414,980 | 12/1968 | Nezbed | 34/9 |

FOREIGN PATENTS OR APPLICATIONS

| | | | |
|---|---|---|---|
| 96,287 | 10/1922 | Switzerland | 159/4 J |
| 111,119 | 8/1925 | Switzerland | 159/4 J |
| 627,050 | 3/1946 | United Kingdom | 159/4 R |

*Primary Examiner*—Jack Sofer
*Attorney, Agent, or Firm*—Dennison, Dennison, Meserole & Pollack

[57] ABSTRACT

The invention relates to a method and an apparatus or system for evaporating liquid and comprises spray drying, spray concentration and conditioning (i.e. cooling and/or moistening) of combustion gas or flue gas. Liquid is atomized or sprayed into an evaporating chamber from a liquid spraying or atomizing device arranged centrally in the upper part of the evaporating chamber, and an unobstructed coherent flow of warm gas, such as combustion gas or flue gas is simultaneously directed substantially axially into the evaporating chamber and upwards towards the atomizing device. Gas phase is currently being discharged from the evaporating chamber at a level substantially below that of the atomizing device, whereby the axially directed gas flow will tend to turn back in a fountain-like manner and spread the atomized liquid so as to continuously form a "protecting umbrella" over the fountain-shaped gas flow, whereby the combustion gas will be properly cooled before contacting the inner walls of the evaporating chamber.

17 Claims, 6 Drawing Figures

METHOD AND APPARATUS FOR EVAPORATING LIQUID

This application is a continuation of Ser. No. 287,868 filed 9-11-72, now abandoned.

The combustion gas may be introduced into the evaporating chamber through an inlet duct or tube extending upwardly and substantially centrally into said chamber, and the outer wall of the inlet duct or tube may then be protected against undue heating and deposition of solid matter by the provision of a continuous liquid film formed by liquid pouring downwardly on said outer wall. The protecting liquid film may be provided by supplyiing liquid at a controlled rate to an upwardly open trough extending around the upper end of the gas inlet duct or tube. Liquid supplied to the trough flows over the outer, upper edge thereof and down on the outer wall of the gas inlet duct or tube. Excess non-evaporated liquid supplied to the trough is collected and removed from the evaporating chamber at the lower end of the said duct or tube.

BACKGROUND OF THE INVENTION

1. Field of the Invention.

The present invention relates to a method in evaporating liquid and comprises evaporation of liquid from a solution or suspension (whereafter the residue may remain in liquid form or consist of a substantially dry substance), as well as cooling of a warm gas by atomizing or spraying a liquid (normally water) in the same. Thus, the present invention comprises as well so-called "spray concentrating" as "spray drying" and "conditioning", i.e. cooling and/or moistening, of flue gas or combustion gas.

2. Description of the Prior Art.

It is known to evaporate liquid from a suspension or solution by spraying the same into an evaporating chamber, a flow of warm drying gas being simultaneously directed into said evaporating chamber. The amount of vapour which may be absorbed and removed by the drying gas passing through the evaporating chamber is — for a certain moisture content of the drying gas — dependent on the inlet temperature of the gas. Therefore, in order to obtain a high evaporating capacity it is desired to obtain a relatively high temperature of the drying gas being directed into the evaporating chamber. Consequently, it has been proposed to use warm combustion gas from an oil burner as drying gas which is passed directly from the burner to the evaporating chamber. However, the temperature of the drying gas may then be so high that special measures must be taken in order to protect the inner walls of the evaporating chamber. For example, these walls may be provided with a lining of firebricks or another fireproof material. This is, however, a relatively expensive solution. Furthermore, in U.S. Pat. No. 2,818,917 it has been proposed to reduce the temperature of the combustion gas from the burner by mixing the gas with cold atmospheric air before the gas is introduced into the evaporating chamber. By the last-mentioned solution the high evaporating capacity desired is, however, not obtained.

When using high inlet temperatures for the drying gas problems are often encountered due to the fact that dried solid constituents of the suspension or solution are deposited on the inner walls of the evaporating chamber so that the evaporation process must be interrupted from time to time in order to clean the chamber walls. This is true even when the evaporating process is a spray concentrating process so that the suspension or solution remains in liquid form after treatment in the evaporating chamber.

U.S. Pat. No. 2,559,989 discloses a spray drying and spray concentrating apparatus comprising an evaporating chamber into which drying gas is continuously introduced through an inlet tube provided at its free end with gas distributing means adapted to secure a diffuse flow of drying gas into the evaporating chamber. Such gas distributing means are rather heat sensitive and may become damaged if the temperature of the drying gas is relatively high, for example when combustion gas is used as drying gas. Furthermore, if the drying gas, such as waste gases, contains soot particles or other solid particles such particles are liable to form deposits on the distribution means. Therefore, the distribution means must be cleaned from time to time.

SUMMARY OF THE INVENTION

According to the invention a method in evaporating liquid is provided, said method comprising continuously introducing a liquid substance substantially centrally into the upper part of an evaporating chamber in an atomized or sprayed condition, simultaneously directing an unobstructed, coherent, continuous flow of warm gas, such as combustion gas or flue gas substantially axially into the evaporating chamber and upwards towards the position of introducing the liquid substance, and discharging gas phase from the evaporating chamber at a level substantially below the said position of introducing the liquid substance and at such a rate that said flow of combustion gas or flue gas tends to turn back in a fountain-like manner and to spread the atomized liquid substance so as to form a layer or bed of suspended liquid droplets over said fountain-like gas flow without use of any special gas distribution means.

The warm flue gas or combustion gas flowing axially and upwardly through the evaporating chamber as an unobstructed, coherent flow will meet the atomized liquid substance coming from the place or position of introducing the same into the evaporating chamber and due to the fact that the gas phase is discharged from the evaporating chamber at a level substantially below that of the place of introducing liquid substance the axially directed gas flow will tend to turn back in a fountain-like manner because the gas tends to flow to the position or positions at which gas phase is discharged from the evaporating chamber. The gas flow directed axially upwardly towards the place of introducing liquid substance will tend to spread the atomized liquid substance in such a manner that a layer or bed of suspended liquid droplets will continuously form a "protecting umbrella" over the fountain-shaped gas flow. Consequently, in a spray concentrating process it is possible to obtain that part of the liquid droplets continuously impinges the side walls of the evaporating chamber and maintain the same in a moistened condition. Thereby the walls of the evaporating chamber will be protected against the warm flue gas or combustion gas, and — in case the liquid is a solution or suspension — solid constituents of the liquid substance having been deposited on the side walls of the evaporating chamber will be dissolved in or washed off by the impinging liquid droplets. In case of spray drying a solution or suspension the place for introducing the liquid substance is preferably arranged at such a distance below the top surface of the evaporating chamber that liquid particles moving in a direction towards said top surface will be evaporated before impinging on said top surface.

It has been found that the most satisfactory flow pattern in the evaporating chamber is obtained when the amount of combustion gas introduced therein is relatively small in relation to the amount of liquid sprayed into the evaporating chamber. Thus, the best results are normally obtained when the weight ratio between the combustion gas or flue gas and the liquid introduced into the evaporating chamber is less than 3.5 and preferably less than 3.0. In some cases the said ratio is even lower than 2. The desired low ratio may for example be obtained by using combustion gas having a high temperature and/or when the liquid or sludge sprayed into the evaporating chamber has a relatively high content of solid particles.

It has been found that the method according to the invention is also very suitable for conditioning combustion gases, for example in order to change their temperature and/or moisture contents so as to make them suitable for passing and for being cleaned in conventional gas filtering systems. Combustion gases to be cleaned in filtering systems may primarily have a temperature being sufficiently low to avoid damaging of the filtering material, and, furthermore, in case of filtering systems functioning according to the electrostatic principle it is important that the combustion gas has a suitable moisture content in order to obtain an effective separation of dust or other solid particles. It is known to cool and moisten combustion gases and flue gases in towers or tubes containing an arrangement of atomizing nozzles by means of which water is sprayed into the gas flowing through the gas conditioning tower or tube. The method according to the invention makes it possible to perform a very effective cooling and moistening of combustion gases or flue gases by using a single spraying or atomizing device, and it has been found that the special flow conditions obtained by the method according to the invention avoid problems relating to deposition of particles of ashes, soot, and other substances carried by the gas flow to be conditioned.

According to the invention combustion gas or flue gas having a temperature exceeding 900° C, preferably 1000° C may be used. The special flow pattern obtained by the method according to the invention prevents damaging of the inner walls of the evaporating chamber even at such high temperatures, and it has been found that by using combustion or flue gases at the said high temperatures in the method according to the invention it is possible to spray concentrate solutions or suspensions of even rather heat sensitive substances such as a solution of nitrophosphate fertilizer which starts to decompose at a temperature as low as 115°–120° C.

As mentioned above the flue or combustion gas used in the method according to the invention may contain solid particles such as soot or ashes originating from the combustion process by which the combustion gas has been generated. However, according to the invention it is possible additionally to direct sand or another particulate material into the flow of combustion gas before it is introduced into the evaporating chamber. This may be advantageous, for example when an ore concentrate is treated in the evaporating chamber, said concentrate requiring contents of a flux, such as sand, in order to be further treated in a melting furnace. The sand is normally available in a moist condition, and it has been found that by using the method according to the invention it is possible to direct the moist sand directly into the flow of combustion gas whereby as well a flashdrying as a thorough mixing of the sand and the ore concentrate treated in the evaporating chamber is being obtained. According to the invention the particulate material is advantageously thrown into the flow of combustion gas with a substantial vectorial velocity component in the direction of the gas flow.

According to the invention the gas phase may be discharged from the evaporating chamber at a level adjacent to or below that at which the gas flow is introduced into the evaporating chamber. Otherwise, the warm combustion gas could possibly have a tendency to flow directly from the inlet opening into the evaporating chamber to the discharge opening or openings for gas phase. By counteracting this tendency the flow path and the dwelling time of the combustion gas in the evaporating chamber are prolonged.

The above described moistening of the side walls which is sometimes desired may according to the invention be prompted by imparting a radially outwardly directed vectorial velocity component to the liquid being introduced into the evaporating chamber when atomizing said liquid. This may according to the invention advantageously be obtained by introducing the liquid into the evaporating chamber by means of an atomizing device comprising a rotating atomizing member. Such an atomizer has compared to atomizing nozzles the advantage that the size of the droplet generated is to a great extent substantially independent of the rate of liquid flow to the atomizing device, and thereby the amount of liquid atomized by the rotating atomizing member may be currently controlled in response to the temperature and feeding rate of the flue gas or combustion gas without any substantial change in atomizing efficiency taking place. As an example, this is rather important when the combustion gas or flue gas is fed to the evaporating chamber from a melting furnace being loaded chargewise.

The invention also relates to an apparatus or a system for use in carrying out the method described above, said apparatus comprising an evaporating chamber, an unobstructed inlet duct or tube for combustion gas or flue gas extending upwardly and substantially centrally into the evaporating chamber from the bottom thereof for providing a substantially axially directed, coherent gas flow in said chamber, a liquid atomizing or spraying device arranged substantially centrally within the evaporating chamber for atomizing or spraying liquid supplied thereto, and at least one discharge conduit for discharging gas phase from the evaporating chamber, said conduit communicating with the evaporating chamber through an opening, the upper part of which is positioned substantially below the level of the atomizing or spraying device.

In such an apparatus or system the flow of warm combustion gas flowing into the evaporating chamber from the gas inlet tube assume a fountain-shape as previously explained and is to some extent isolated from the side walls of the evaporating chamber by the atomized liquid emerging from the liquid atomizing or spraying device till the combustion gas has been sufficiently cooled.

BRIEF DESCRIPTION OF THE DRAWING.

The invention will now be described more in detail with reference to the accompanying drawings, wherein FIG. 1 diagrammatically shows a first embodiment of a spray concentrating apparatus or system according to the invention, FIGS. 2–4 each shows a further embodiment of an evaporating chamber for use in spray drying systems.

DESCRIPTION OF THE PREFERRED EMBODIMENTS.

Figure 1:
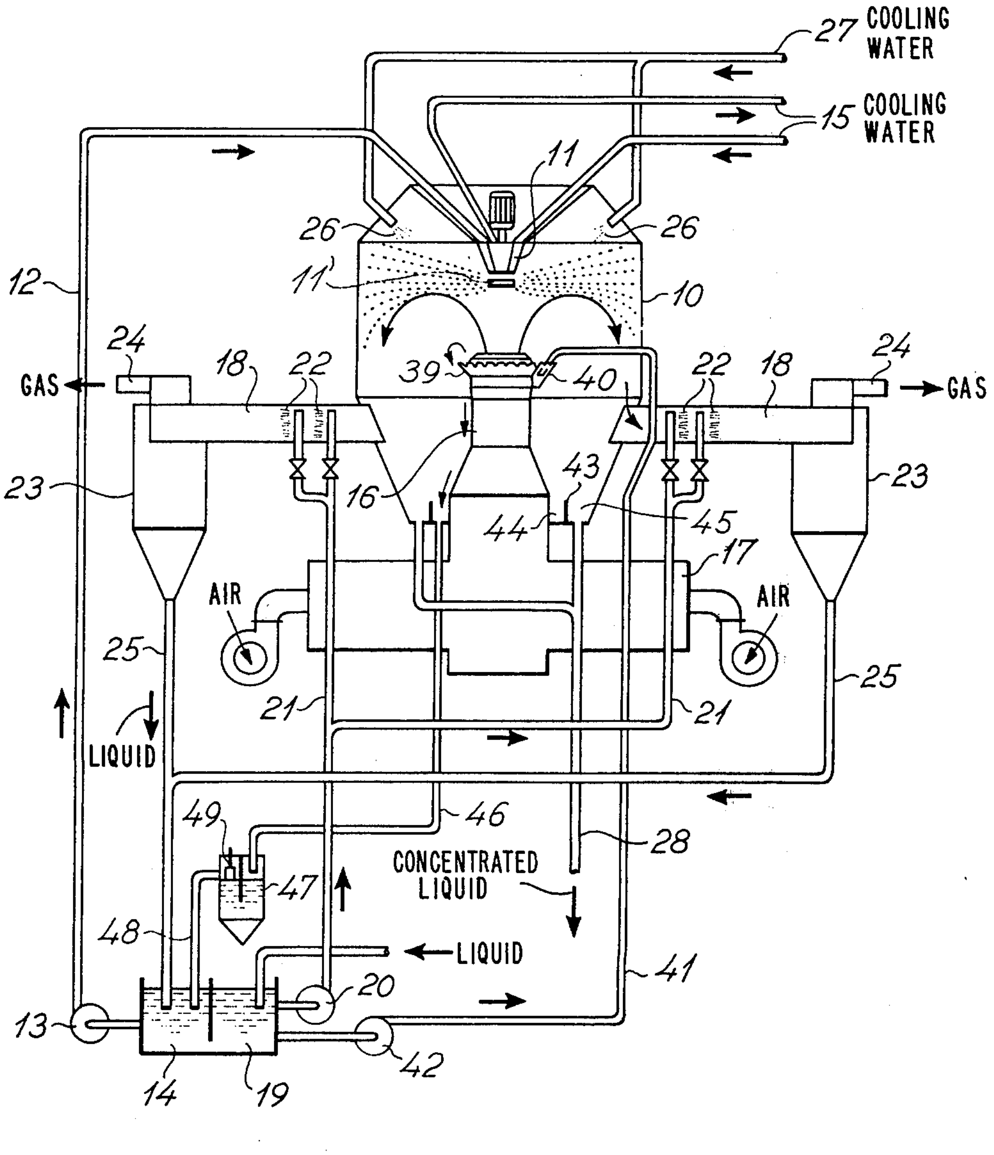

The evaporating apparatus or system shown in FIG. 1 is a so-called spray concentrating system comprising an evaporating chamber 10, preferably made from metal sheet such as of stainless steel. A spraying or atomizing device 11, which is preferably of the type comprising an atomizing rotating wheel 11', is arranged centrally in the upper part of the evaporating chamber and connected to a first reservoir 14 for solution or suspension to be concentrated by means of a conduit 12 including a pump 13. The spraying device 11 is also connected to cooling water conduits 15 by means of which cooling water may be circulated through the spraying or atomizing device. The bottom part of the evaporating chamber 10 has a double frusto-conical shape, and an inlet duct or tube 16 for combustion gas has an unobstructed opening through which a coherent gas flow may be directed axially into the evaporating chamber and towards the atomizing spraying device 11. The duct or tube 16, which may be made of refractory material and covered by plates or sheets of stainless steel at its outer wall, may form the combustion gas discharging tube of an oil burner 17. The apparatus or system shown in FIG. 1 further comprises a pair of outlet conduits or tubes 18 through which gas phase may be evacuated from the chamber 10 by means of a blower or another pumping device, not shown.

The apparatus or system shown in FIG. 1 comprises a further liquid reservoir 19 from which suspension or solution may be pumped through conduits 21 by means of a pump 20 to liquid atomizing or spraying devices 22 which are preferably atomizing or spraying nozzles. Each outlet tube 18 opens into a cyclone 23 or another device being able to separate gas phase and liquid phase from each other, and each of these cyclones is connected to a conduit 24 for conducting the gas phase away and to a conduit 25 for conducting the separated liquid phase into the liquid reservoir 14. Spraying nozzles 26 are arranged within the upper part of the evaporating chamber 10 and via conduits 27 connected to a pump and a reservoir for cooling water, not shown. These nozzles 26 are adapted to spray the inner wall of the evaporating chamber with cooling water in case supply of atomized solution or suspension from the spraying device 11 should be interrupted or fail.

At its upper end the gas inlet duct or tube 16 is provided with an outer collar 39 forming an upwardly open channel or trough. The upper end of the collar is provided with a number of mutually spaced notches, and the channel formed by said collar is enlarged at 40. A liquid supply conduit 41 opens into the enlargement 40, and liquid may be supplied to the channel or trough at a controlled rate from the reservoir 19 through said supply conduit 41 by means of a pump 42. A partition wall 43 projecting upwardly from the bottom of the evaporating chamber and surrounding the gas inlet duct or tube 16 defines together with the lower part of said inlet duct and the lower part of the side wall of the evaporating chamber 10 two liquid collecting channels 44 and 45, respectively, of which the channel 44 is connected to the liquid reservoir 14 by means of a liquid draining tube 46, whereas the channel 45 is connected to an outlet tube 28. The draining tube 46 includes a flow controlling device 47, for example a liquid level controlling mechanism.

If desired, the channel or trough 39 may be provided with turbulence generating means, for example in form of a tube having openings through which air or gas may be blown. The purpose of these means is to prevent clogging of the trough 39 due to depositions of solid material therein.

The apparatus or system shown in FIG. 1 functions as follows:

The suspension or solution to be treated is placed in the reservoir 19, and the reservoir 14 contains a suspension or solution which, as explained in the following, has already been preconcentrated by evaporation of liquid. The pump 13 pumps preconcentrated solution or suspension from the reservoir 14 through the conduit 12 to the spraying device 11 which — as indicated on the drawing — imparts a direction of movement with a substantial radial component to the atomized or sprayed liquid so that part thereof impinges the cylindrical side wall of the evaporating chamber 10 and pours down along the same as a liquid film which is continuously being renewed. The oil burner 17 is operating and the warm combustion gas being generated flows directly into the chamber 10 through the combustion gas inlet duct or tube 16 as an axial flow directed towards the atomizing wheel 11'. Gas phase is simultaneously evacuated from the evaporating chamber 10 through the outlet tubes 18. The tubes 18 open into the chamber 10 at a level which, as shown in FIG. 1, is substantially lower than that of the spraying device 11, and therefore the flow of combustion gas will be sucked back towards the lower part of the chamber in a fountain-like manner as indicated with arrows in FIG. 1 whereby an excellent contact between the warm combustion gas and the liquid particles is obtained without the combustion gas contacting the side walls of the evaporating chamber 10 before the gas has been suitably cooled by evaporation of liquid particles.

Non-concentrated suspension or solution is by means of the pump 20 pumped from the liquid reservoir 19 through the conduits 21 to the nozzles 22 arranged within the outlet tubes 18. Due to the intimate contact which is thereby obtained between the atomized or sprayed, non-concentrated solution or suspension and the still warm gas phase flowing out from the evaporating chamber 10, part of the liquid will be transformed into vapour form and be discharged together with the other gas phase through the conduits 24. The remaining and now more concentrated part of the suspension or solution is separated by the cyclones 23 and conducted to the reservoir 14 through the conduits 25. As described above, the preconcentrated suspension or solution may then be pumped from the reservoir 14 to the atomizing or spraying device 11 and in atomized or sprayed form be introduced into the evaporating chamber 10 where the final concentrating is taking place. In order to prevent solid materials contained in the solution or suspension being treated in the evaporating chamber from depositing on the outside of the gas inlet duct or tube 16, and to prevent undue heating of the outer wall of the inlet tube 16 liquid is supplied to the trough 39 from the reservoir 19 by means of the pump 42 and via the supply tube 41. The liquid is supplied to the trough 39 at such a controlled rate that it flows over the upper edge of the collar forming the trough, mainly through the notches therein, as a uniform, surrounding, and substantially continuous liquid film flowing downwardly around the outer surface of the duct or tube 16. The liquid must be supplied at such a rate that a suitable amount of non-evaporated liquid remains at the lower end of the gas inlet duct 16 and is collected in the collecting channel 44 from which the collected liquid is conducted to the control device 47 through the draining conduit 46. The liquid flows from the control device through an outlet 48 to the reservoir 14. The liquid level in the device 47 depends on the flow rate through the tube or conduit 46, and the said liquid level may therefore be used to indicate whether the amount of liquid circulated by the pump 42 is suitable or not. The said liquid level may, for example, be sensed by a float 49 which may activate an alarm device calling upon the operator's attention if the liquid level in the control device 47 exceeds certain predetermined limits. It should be understood that other types of devices or mechanisms for surveying or controlling the rate of liquid supply to the trough 39 through the tube 41 may be used.

In the apparatus or system shown in FIG. 1 the spray concentration or evaporation is performed as a two-step process using the counter-current principle, the first evaporation step taking place within the outlet tubes 18, and the second and final evaporation step taking place within the evaporation chamber 10. The final, concentrated liquid product may continuously flow out from the evaporating chamber 10 through the outlet tube 28. By means of a cooling medium being circulated through the conduits 15 the atomizing or spraying device 11 may be maintained at a suitable temperature. It should be noted that, if desired, an amount of solution or suspension may currently or at certain time intervals be transferred directly from one of the liquid reservoirs 14 and 19 to the other whereby part of the solution or suspension may be recirculated in the apparatus or system, if necessary, or part of the solution or suspension may be withdrawn from treatment in the first step.

Figure 2:
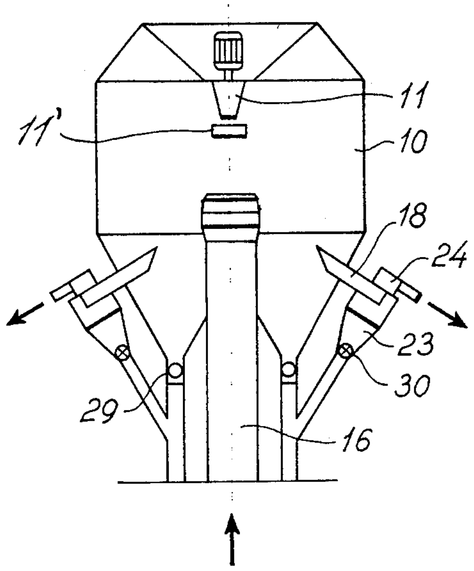

The embodiment of the evaporating chamber shown in FIG. 2 may be used as a drying chamber in a spray drying system, or for cooling of combustion gas or flue gas, for example before the gas passes an electrofilter. The bottom of the evaporating chamber or drying chamber 10 is shaped as a double funnel, and a screw conveyor 29 for discharging the dry powder material from the drying chamber 10 is arranged in the lower part of each funnel. In the embodiment shown in FIG. 2 the free end of the outlet tubes 18 extending into the drying chamber 10 are positioned at substantially the same levels as that of the free inner end of the inlet duct or tube 16, and the end surfaces of the tubes 18 are inclined in relation to the axis thereof as shown on the drawing. A discharging device 30 for discharging possible powder material may be arranged at the bottom of each of the cyclones.

Figure 3:
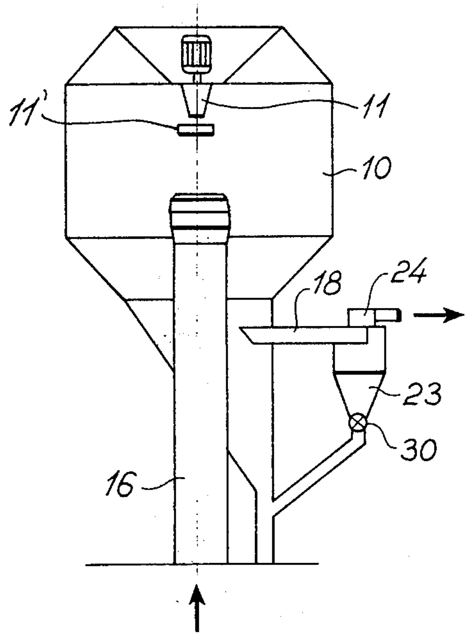
Figure 4:
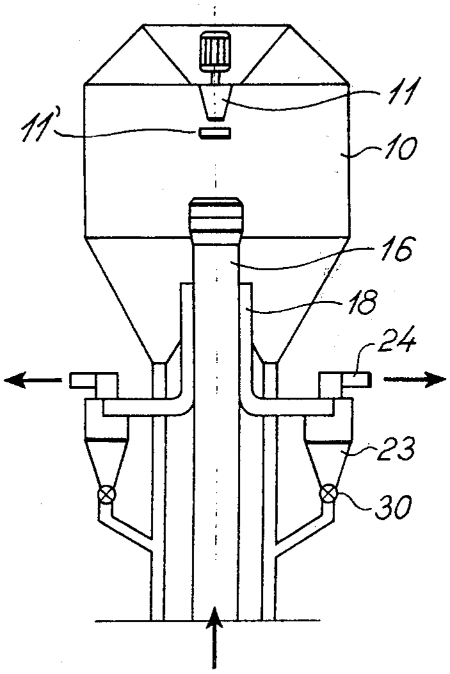

The embodiment of the evaporating chamber shown in FIG. 3 is also intended for use in a spray drying system. The bottom of the drying chamber 10 is funnel-shaped, and the embodiment comprises only a single outlet tube 18 arranged at a level well below the end surface of the gas inlet duct 16. The embodiment shown in FIG. 4 is also adapted for use in a spray drying system. In this case the drying chamber or evaporating chamber 10 is shaped as a double funnel, and the gas outlet tubes 18 extend downwardly along the gas inlet duct 16 and then outwardly therefrom. The ends of the tubes 18 are, however, arranged in spaced relation to and below the end of the inlet duct or tube 16.

Figure 5:
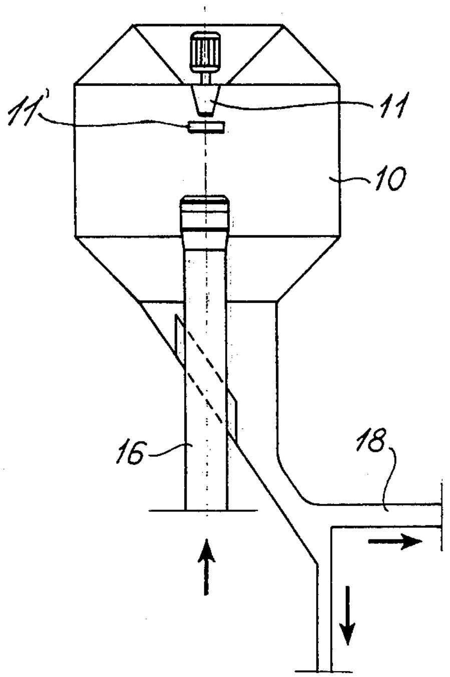
FIG. 5 shows a still further embodiment of the evaporating chamber for use in a spray concentrating system.

The embodiment shown in FIG. 5 is adapted for use in a spray concentrating system, and the bottom part of the evaporating chamber 10 is funnel-shaped. The embodiment shown in FIG. 5 comprises only a single outlet tube 18 for gas phase, and the said tube is arranged in such a manner that a special cyclone for separating liquid and gas phase may be dispensed with.

The embodiment shown in FIGS. 2–5 may be used in connection with an arrangment of tubes or conduits and reservoirs as shown in FIG. 1. The various embodiments of evaporating chambers may, however, also be used in connection with other types of systems or plants such as systems in which the evaporation is performed only in a single step, or — in case evaporation is being performed in two or more steps — in which evaporation is taking place in two or more special evaporating chambers of which one or more may be designed in accordance with the principles of the present invention.

Figure 6:
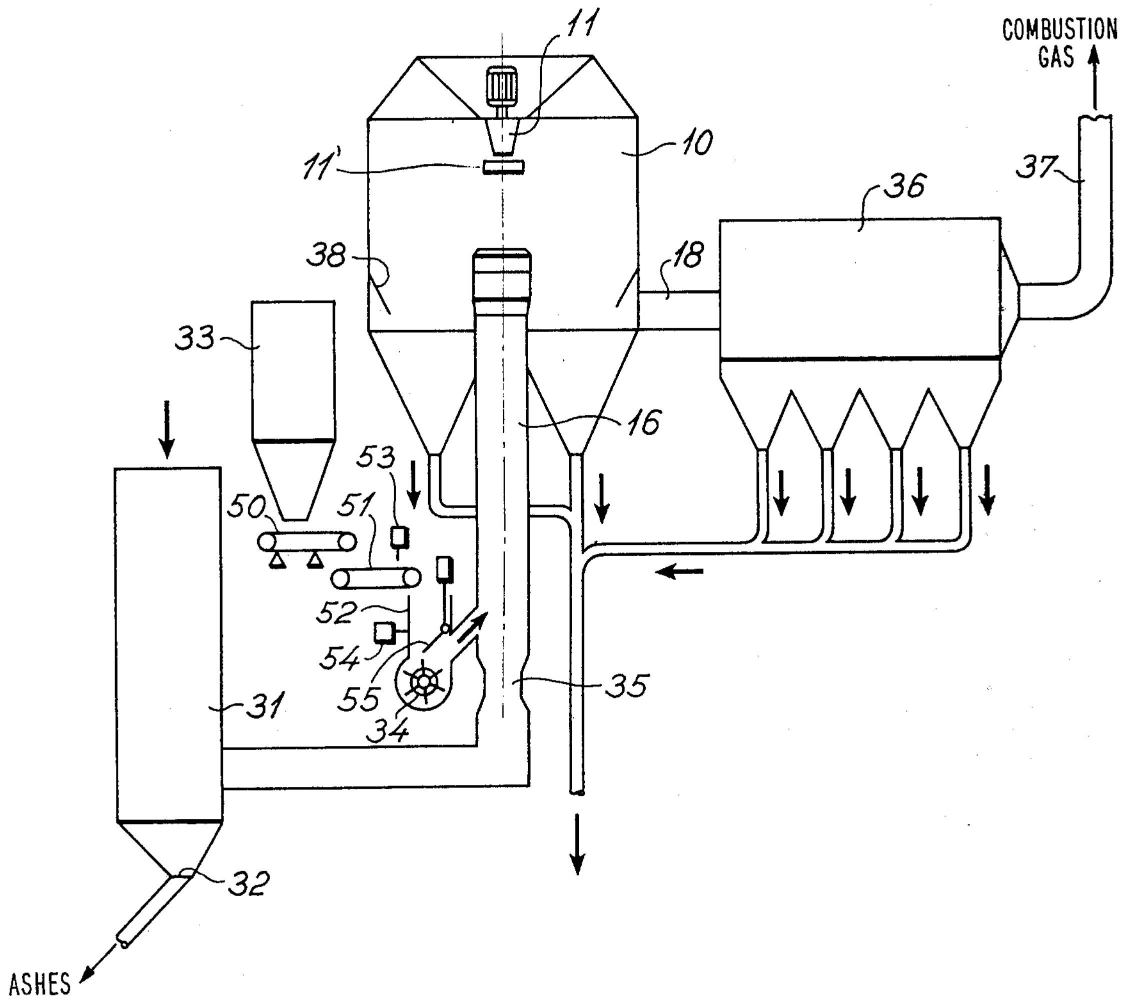
FIG. 6 shows an embodiment of a spray drying system having means for supplying a particulate material to the flow of combustion gas or flue gas.

FIG. 6 shows an embodiment of an apparatus or a system according to the invention and adapted for spray drying an ore concentrate to which flux is simultaneously supplied. The system comprises a furnace 31 which may for example be coal fired, and which includes an opening 32 at the bottom for outlet of ashes. The flue duct of the furnace is connected to the gas inlet duct 16 opening into the evaporating or drying chamber 10. The system shown further comprises a funnel 33 from which a particulate material may flow down on a so-called weighing belt 50 from which the material may fall down upon a further belt conveyor 51 from which the material falls down into a chute 52 opening into the housing of a throwing rotor 34 adapted to throw a stream of particlate material into the gas inlet duct or tube 16 in a direction inclined in relation to the axis of the tube and at a position immediately above a Venturi throat 35 of the tube 16. The Venturi throat promotes a uniform introduction of the particulate material in the gas flow, said particulate material being introduced into the gas in the duct 16 by the throwing rotor 34 with a vectorial velocity component in the direction of the gas flow. The rate of feeding particulate material to the throwing rotor 34 and the position of a movable gate 55 may be controlled by means of sensing devices 53 and 54 of which the device 54 is preferably an acoustic sensing device.

The drying chamber or evaporating chamber 10 is provided with gas discharge openings arranged under oblique guiding plates 38 and communicating with an electrofilter 36 through the outlet tube 18. When the combustion gas or flue gas has been freed from solid particles in the electrofilter 36 it may flow through a discharge tube 37 to a funnel or chimney, not shown. Dried material may be removed from the bottom of the evaporating chamber 10 as well as from the electrofilter 36 in a manner known per se.

When an ore concentrate is being dried in the system described, a flux, such as wet sand, may be introduced into the gas inlet tube 16. The wet sand will then be flash-dried and uniformly dispersed in the gas flow and thus be thoroughly mixed with the resulting dried ore product being discharged from the drying chamber 10. The said mixed product may then be further treated in a melting furnace.

The invention will now be further illustrated in the following examples:

EXAMPLE 1

In a refuse disposal plant refuse with varying heating value was burnt. The incinerator used was not provided with a steam boiler for utilizing the heat of the combustion gas. The temperature of the combustion gas varied between 1050° C and 700° C depending on the heating value of the refuse. It was desired to cool the gas to a temperature of about 300° C in order to make it suitable for being freed from dust in an electrofilter. The said cooling of the gas was performed in a system with an evaporating chamber 10 of the type shown in FIG. 2. The combustion gas was introduced through the duct 16, and water was atomized in the chamber 10 by means of the atomizing device 11.

The evaporating chamber had a diameter of 610 cm and the cylindrical part of the chamber had a height of 495 cm. In order to facilitate rinsing of the gas inlet duct 16 it was given a square cross section of 1200 × 1200 cm.

Combustion gas in an amount of 44,000 cubic meters (at 0° C and 760 mm Hg) per hour was supplied to the chamber 10. Water was atomized in the evaporating chamber, and the amount of water was automatically controlled in such a manner that the outlet temperature of the combustion gas was maintained substantially at 300° C. A water amount of 17,000 kilograms/hour was atomized at an inlet temperature of 1050° C for the combustion gas, whereas the water amount was 9000 kilograms/hour at a gas inlet temperature of 700° C.

EXAMPLE 2

A gas conditioning system or plant comprising an evaporating chamber of the type shown in FIG. 2 but without cyclones was used for conditioning of part of the discharge gas from an electric melting furnace before the gas was passed to an electrostatic dust separator.

Ferrosilicon was made in the furnace, and the discharge gas had a temperature between 160° C and 260° C and contained dust in an amount of 2 grams/cubic meters.

The gas was passed to the evaporating chamber 10 of the conditioning system. The diameter of the chamber was 2.25 m, and the height of its cylindrical side wall was 1.0 m. The gas inlet duct or tube 16 had a diameter of 0.40 m. Water was atomized in the evaporating chamber by means of a spraying or atomizing device with a rotating disc or wheel 11', which had a diameter of 0.12 m and rotated with a speed of 18,000 r.p.m.

Gas was discharged from the conditioning system through a tube which opened into the conical bottom of the evaporating chamber, and the gas was passed to a conventional electrostatic dust separator and then to the atmosphere.

The amount of water supplied to the atomizing device was controlled in dependency of the outlet temperature of the gas discharged from the evaporating chamber by means of a pneumatic control device.

The gas discharged from the conditioning system amounted to about 5000 cubic meters/hour, and despite of heavy changes of the outlet temperature of the gas discharged from the melting furnace it was possible to maintain the outlet temperature of the gas from the conditioning system substantially constant at 62° C ± 1° C.

After conditioning of the gas the dust separation in the electrostatic dust separator was so efficient that the gas discharged from the dust separator contained dust in an amount of only about 82 milligrams/cubic meters (at 0° C and 760 mm Hg).

EXAMPLE 3

In a system of the same type as that described in Example 1 cooling of the gas was combined with drying of digested sewage sludge. The sewage sludge was concentrated in a thickener to a dry matter content of 7% by weight and was thereafter supplied to the atomizing device 11. The outlet temperature of the drying gas of combustion gas was 130° C, and a product having a water content of 10% by weight was obtained. The product may be used either as a fertilizer or be burnt in the incineratoı.

During periods where the amount of sewage sludge supplied to the evaporating chamber was too small in relation to the available amount of combustion gas from the incinerator, water was added to the sewage sludge in an amount sufficient to maintain the outlet temperature of the gas from the evaporating chamber at 130° C being the optimal temperature for an electrofilter in the present case.

EXAMPLE 4

A system having an evaporating chamber as that shown in FIG. 3 was used for spray drying in connection with preparing sulphidic cooper-nickel ore concentrate for melting. The ore concentrate had the form of a slurry with a dry matter content of 72% by weight.

The drying chamber 10 had a diameter of 13 m, and the height of the cylindric side wall of the chamber was 7.5 m. The distance between the upper end of the gas inlet duct 16 and the atomizing wheel 11' of the spraying device 11 was 4 m. The vertical distance between said atomizing wheel and the top wall of the chamber was 2.5 m, and the atomizer was driven by a 600HP motor. Slurry was supplied to the atomizing device in an amount of 220 tons/hour. Dust containing combustion gas generated by burning of pulverized coal and having a temperature of 1000° C was supplied to the evaporating chamber through the gas inlet duct or tube 16 in an amount of 200,000 kilograms/hour. The drying gas or combustion gas was discharged from the evaporating chamber at a temperature of 130° C.

A dry powder which contained 0.2% by weight of water was produced. The total production of powder separated in the drying chamber, the cyclones and in the electrofilter was 3800 tons/24 hours.

EXAMPLE 5

A system comprising an evaporating chamber as that shown in FIG. 6 was used for spray drying and simultaneous addition of a flux in connection with the preparation of a sulphidic, copper-nickel ore concentrate.

The evaporating chamber 10 had a diameter of 10 m, and the height of the cylindrical side wall of the chamber was 6.45 m. The diameter of the gas inlet duct or tube 16 wss 2 m. The vertical distance between the upper edge of the tube 16 and the atomizing wheel 11' of the atomizing device 11 was 4 m.

A copper-nickel slurry with a dry matter content of 65% by weight was supplied to the atomizing or spraying device 11. Drying gas was produced in the furnace 31 to which pulverized coal containing 20% by weight of ashes was supplied in an amount of 2600 kilograms/hour. About half of the amount of ashes was discharged through the opening 32 at the bottom of the furnace. Combustion gas was produced in an amount of 55,000 kilograms/hours and had a temperature of 1000° C when discharged from the furnace.

Sand in an amount of 8,170 kilograms/hour and having a water content of 7% by weight was supplied from the funnel 33 to the gas inlet duct 16 by means of the throwing rotor 34. The powder fractions collected from the drying chamber and the electrofilter amounted to 70% and 30%, respectively, of the total amount. The said two fractions were united and amounted to 39,500 kilograms/hour. The product which was freely flowing, contained 99.9% dry matter and was suitable for pneumatic transportation and for further treatment in a flash-melting furnace in accordance with the Outokumpu-method described in U.S. Pat. No. 2,506,557.

EXAMPLE 6

In a spray concentrating system of the type shown in FIG. 1 the cylindrical part of the evaporating chamber 10 had a height of 275 cm and a diameter of 640 cm. The combustion gas inlet duct or tube 16 had a diameter of 150 cm, the outlet tubes 18 were arranged immediately below the cylindrical part of the evaporating chamber, and the axial spacing between the upper part of the openings of these tubes and the atomizing wheel 11' of the atomizing or spraying device 11 was 150 cm.

40,000 kilograms/hour of an aqueous solution of a nitrophosphate fertilizer were supplied to the evaporating chamber, and combustion gas generated by the combustion of 1,400 kilograms/hour of a fuel oil was used as drying gas. The temperature of the drying gas was 1600° C.

The starting material which had a water content of 65% by weight and a temperature of 20° C was supplied to the reservoir 19 from which it was pumped to the nozzles 22 and sprayed into the outlet tubes 18 where the gas temperature upstream to the nozzles was 130° C. The gas phase which was evacuated through the conduits 24 from the cyclones 23 amounted to 68,000 cubic meters/hour and had a temperature of 85° C.

20,000 kilograms/hour of concentrate at a temperature of 85° C was discharged through the outlet conduit 28.

The evaporating chamber 10 was made of stainless steel and did not suffer due to the high drying gas temperature, and no substantial tendency to deposition of solid matter on the inner walls of the evaporating chamber was found.

During the concentrating process the product was not exposed to heat damaging to any particular extent which was proved by measuring the loss of nitrogen oxides.

It should be understood, that various changes and modifications of the embodiments shown in the drawings may be made within the scope and spirit of the present invention. Thus, it is possible to combine the details of the apparatuses shown in FIGS. 1–6 in various manners. As an example, the types of evaporating chambers shown in FIGS. 2–6 may — when used in connection with a spray concentrating or gas conditioning process — be provided with a device for protecting the outer side of the gas inlet tube 16 by a liquid film as shown in FIG. 1.

We claim:

1. A method of evaporating liquid, said method comprising continuously introducing a liquid substance substantially centrally and generally radially into the upper part of an evaporating chamber in an atomized or sprayed condition, simultaneously directing an unobstructed, coherent, continuous flow of warm combustion gas or flue gas axially into the evaporating chamber and upwards for a considerable distance towards the position of introducing the liquid substance, the weight ratio between the combustion gas or flue gas and said liquid substance introduced into the evaporating chamber being less than 3.5:1 and preferably less than 3.0:1, and continuously discharging gas phase from the evaporating chamber at a level substantially below the said position of introducing the liquid substance and at such a rate that said flow of combustion gas or flue gas into the evaporating chamber tends to be turned back by the atomized or sprayed liquid in a fountain-like manner and to spread the atomized liquid substance so as to form a layer or bed of suspended liquid droplets over said fountain-like gas flow.

2. A method according to claim 1, wherein the gas phase is discharged from the evaporating chamber at a level equal to or below that at which the gas flow is introduced into the evaporating chamber.

3. A method according to claim 1, wherein the liquid substance is introduced into the evaporating chamber by means of an atomizing device comprising a rotating atomizing member.

4. A method according to claim 1, wherein the weight ratio between the combustion gas or flue gas and the liquid substance introduced into the evaporating chamber is less than 2:1.

5. A method according to the claim 1, wherein gas having an inlet temperature exceeding 900° C, preferably 1000° C, is used.

6. A method according to claim 5, wherein sand or another particulate material is directed into the flow of combustion gas before it is introduced into the evaporating chamber.

7. A method according to claim 6, wherein the particulate material is thrown into the flow of combustion gas with a substantial vectorial velocity component in the direction of the gas flow.

8. An apparatus for evaporating liquid and comprising an evaporating chamber, an unobstructed inlet duct or tube for the introduction of combustion gas or flue gas extending upwardly and substantially centrally into the evaporating chamber from the bottom thereof for providing an unobstructed upwardly and axially directed coherent gas flow in said chamber for a considerable distance, a liquid atomizing or spraying device arranged substantially centrally within the evaporating chamber for atomizing or spraying liquid supplied thereto in a generally radial direction, and at least one discharge conduit for continuously discharging gas phase from the evaporating chamber, said conduit communicating with the evaporating chamber through an opening, the upper part of which is positioned substantially below the level of the atomizing or spraying device.

9. An apparatus or a system according to claim 8, wherein the gas inlet duct or tube is connected to supply means for particulate material downstream of and preferably adjacent to a Venturi throat on the gas inlet duct or tube.

10. An apparatus or a system according to claim 8, further comprising means for providing a liquid film along the outer wall of the gas inlet duct or tube within the evaporating chamber.

11. An apparatus or a system according to claim 10, wherein at its upper free end the gas inlet tube is provided with an outer, surrounding, upwardly open trough-shaped member to which liquid may be supplied by means of a liquid supplying conduit.

12. An apparatus or a system according to claim 10, further comprising means for draining unevaporated part of the liquid flowing down along the gas inlet duct or tube, said draining means comprising means for surveying the rate at which said liquid is drained from the evaporating chamber.

13. An apparatus or a system according to claim 8, wherein said liquid atomizing or spraying device is of the type comprising a rotating atomizing member.

14. A method in evaporating liquid, said method comprising atomizing or spraying a liquid substance into the upper part of an evaporating chamber substantially at the central axis thereof, simultaneously directing a flow of warm gas into the evaporating chamber through a gas inlet duct or tube extending substantially axially and upwardly for a considerable distance into the evaporating chamber, said gas flow being directed towards the position of introducing the liquid substance, discharging gas phase from the evaporating chamber at a level substantially below the said position of introducing the liquid substance and wetting the outer wall of the gas inlet duct or tube with liquid.

15. A method in spray concentrating a liquid according to claim 14, wherein said liquid substance is a suspension or solution.

16. A method in spray drying an ore concentrate slurry according to claim 14, wherein a particulate material is thrown into the flow of warm gas with a substantial vectorial velocity component in the direction of the gas flow.

17. An apparatus or a system for evaporating liquid and comprising an evaporating chamber, an inlet duct or tube for combustion gas or flue gas extending upwardly for a substantial distance and substantially centrally into the evaporating chamber from the bottom thereof for providing a substantially axial gas flow into said chamber, a liquid atomizing or spraying device arranged substantially centrally within the upper portion of the evaporating chamber for atomizing or spraying liquid supply thereto and of the type having a rotating atomizing member, at least one discharge conduit for discharging gas phase from the evaporating chamber and being connected to the evaporating chamber at a level substantially below that of the atomizing or spraying device as well as the upper end of the gas inlet duct, an upwardly open channel or trough member arranged around the outer wall of the gas inlet duct or tube at the upper end thereof, means for supplying a liquid to said channel or trough member at a controlled rate for overflow thereover to wet the outer wall of the gas inlet duct, collecting and draining means arranged at the bottom part of the evaporating chamber for collecting and draining unevaporated liquid from the outer wall of said inlet duct or tube, and surveying means for surveying the rate at which liquid is drained by said collecting and draining means.

* * * * *